Figure 1:
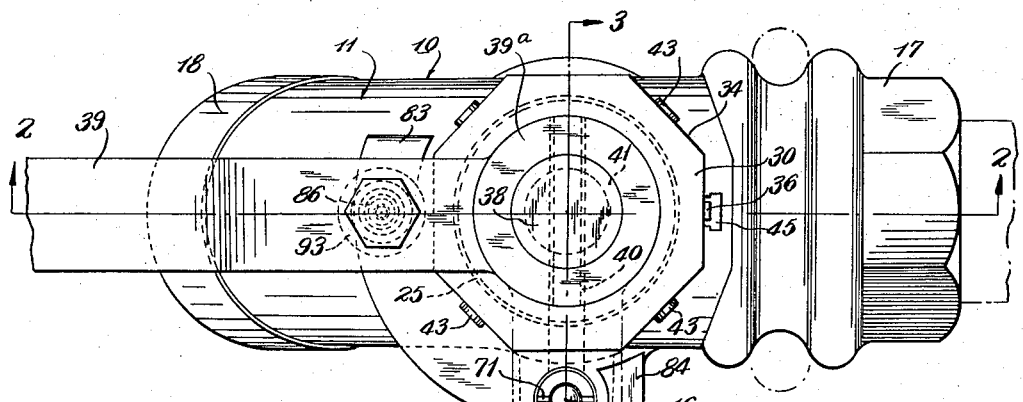

March 17, 1959            J. R. SNYDER            2,877,979

SHUT-OFF VALVE WITH SEALING AND VENTING MEANS

Filed Dec. 15, 1955            3 Sheets-Sheet 1

INVENTOR.
JACOB RUSH SNYDER
BY
ATTORNEYS

March 17, 1959     J. R. SNYDER     2,877,979
SHUT-OFF VALVE WITH SEALING AND VENTING MEANS
Filed Dec. 15, 1955     3 Sheets-Sheet 2

INVENTOR.
JACOB RUSH SNYDER
ATTORNEYS

March 17, 1959 J. R. SNYDER 2,877,979
SHUT-OFF VALVE WITH SEALING AND VENTING MEANS
Filed Dec. 15, 1955 3 Sheets-Sheet 3

INVENTOR.
JACOB RUSH SNYDER
BY Hudson, Boughton,
Williams, David & Hoffmann
ATTORNEYS United States Patent Office 2,877,979
Patented Mar. 17, 1959

2,877,979

SHUT-OFF VALVE WITH SEALING AND VENTING MEANS

Jacob Rush Snyder, Cleveland, Ohio

Application December 15, 1955, Serial No. 553,315

4 Claims. (Cl. 251—174)

This invention relates to valve devices of the rotatable plug type and is applicable to valves of this kind intended for various uses such as shut-off cocks, selector valves, quick-disconnect couplings, and the like. As one example thereof, the present invention is disclosed herein in the form of an angle cock suitable for use in pneumatic brake systems of railway vehicles and for other purposes, but without any intention of limiting the invention solely to such an angle cock use.

An object of the invention is to provide a novel plug type valve device which is of a simple construction comprising a relatively small number of parts adapted to be economically produced and assembled, and which will be efficient and durable in service.

Another object is to provide such a valve device having novel sealing means for the rotatable plug.

A further object is to provide such a valve device having novel relief valve means for releasing or venting the fluid pressure from the discharge passage of the device.

Still another object is to provide a novel valve device having a plug rotatable in a valve body with clearance therebetween for ease of operation, and in which the sealing means for the plug comprises dual-purpose means by which one portion of a packing is sealingly pressed against the plug and another portion thereof is sealingly expanded in the valve body.

A further object is to provide a novel valve device of the character mentioned above in which the relief valve means includes a normally closed vent valve and operates to vent the outlet passage pressure through a portion of the clearance space between the plug and valve body, and in which actuation of the plug also causes actuation of the vent valve to open position.

Additionally, this invention provides a novel plug type valve device embodying a vent valve means for venting fluid pressure from the outlet passage and in which novel means is provided for excluding foreign matter and insects from the vent valve means.

The invention can be further briefly summarized as consisting in certain novel combinations and arrangements of parts hereinafter described and particularly set out in the claims hereof.

Figure 2:
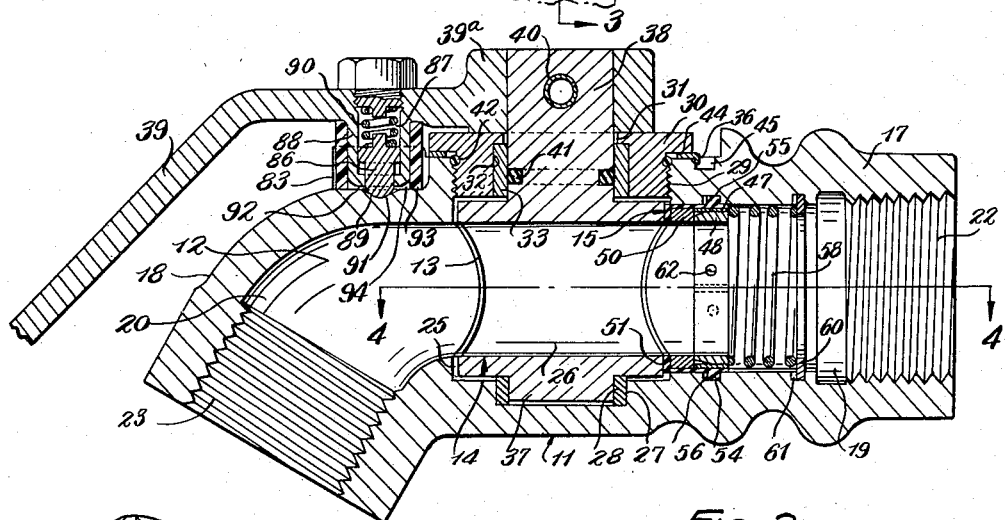
Figure 5:
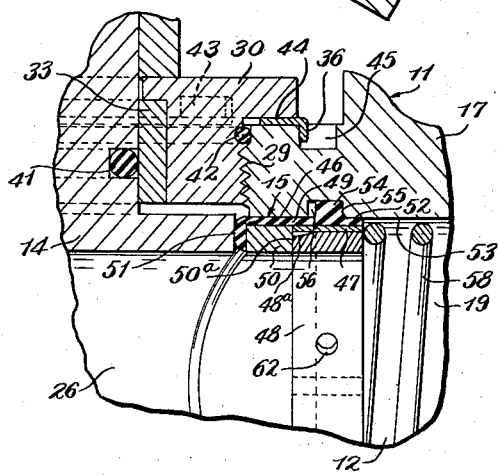
Figure 4:
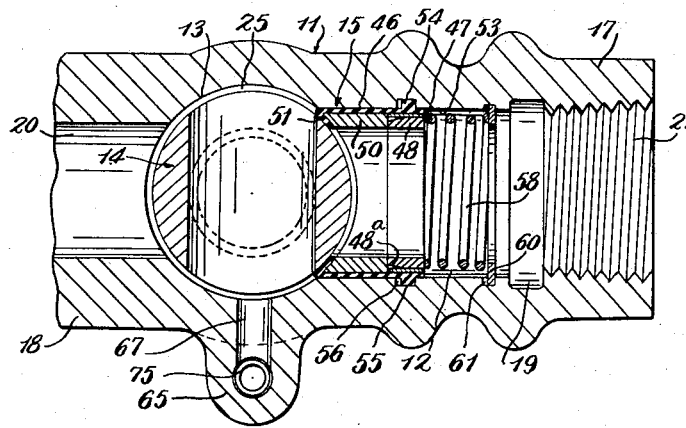
Figure 3:
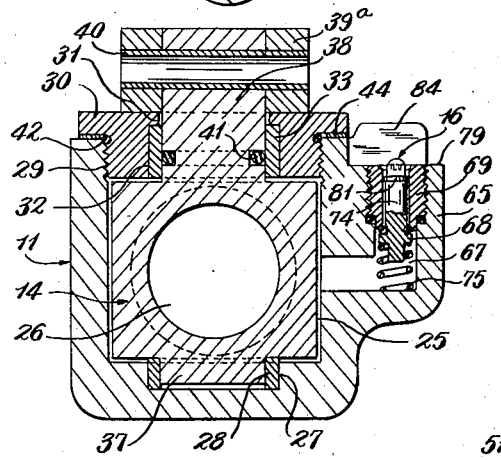
Figure 6:
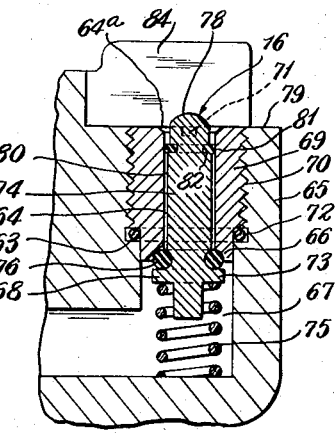
Figures 7, 9:
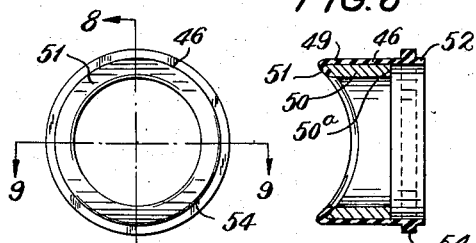
Figures 8, 10, 11:
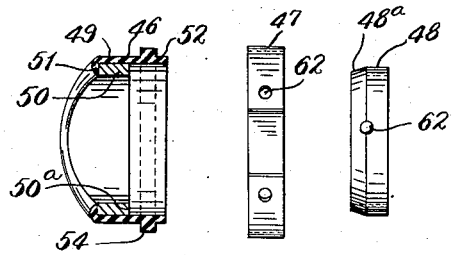
Figure 12:
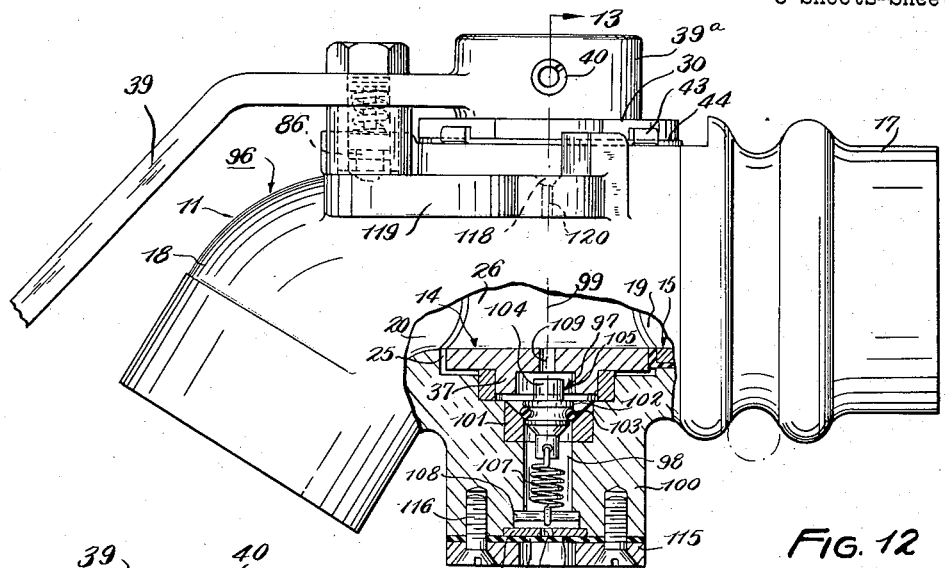
Figure 13:
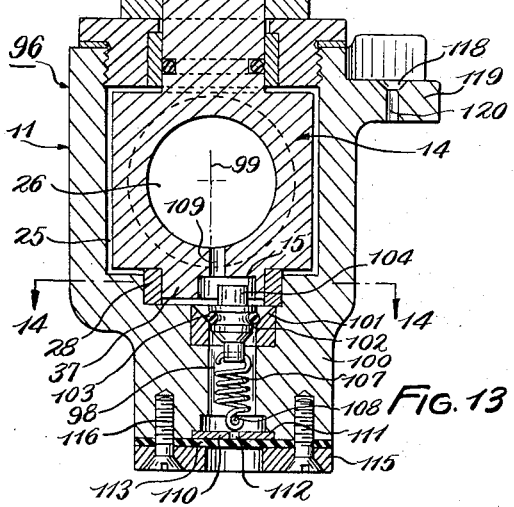
Figure 14:
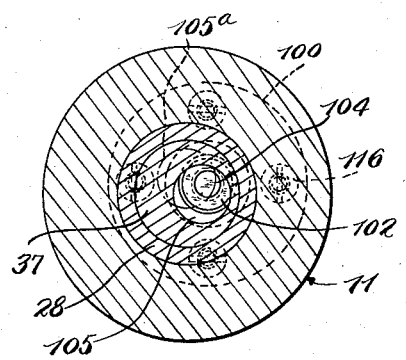
Figure 15:
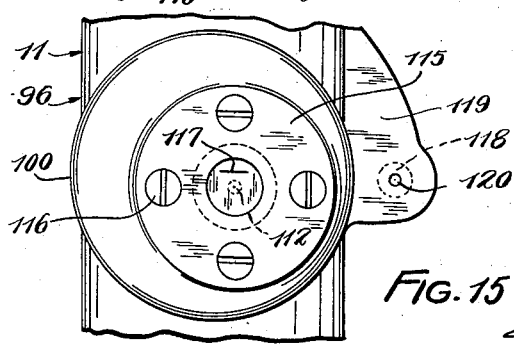

In the accompanying sheets of drawings forming a part of this specification:

Fig. 1 is a top plan view of a valve device embodying the present invention,

Fig. 2 is a vertical longitudinal section taken through the valve device as indicated by section line 2—2 of Fig. 1, Fig. 3 is a transverse vertical section taken through the valve device on section line 3—3 of Fig. 1, Fig. 4 is a partial horizontal longitudinal section taken as indicated by section line 4—4 of Fig. 2 but with the plug in its closed position, Fig. 5 is a fragmentary sectional view corresponding with a portion of Fig. 2 and illustrating the plug sealing means on a larger scale, Fig. 6 is a fragmentary sectional view corresponding with a portion of Fig. 3 and illustrating the vent valve means on a larger scale, Fig. 7 is an end elevation of the packing sleeve in detached relation and as seen from the plug-engaging end thereof, Fig. 8 is a vertical longitudinal section taken through the packing sleeve as indicated by section line 8—8 of Fig. 7, Fig. 9 is a horizontal longitudinal section taken through the packing sleeve as indicated by section line 9—9 of Fig. 7, Fig. 10 is a side elevation of an expander ring for the packing sleeve, the ring being shown in a detached relation in an expanded condition, Fig. 11 is a side elevation showing another ring of the plug sealing means in detached relation, Fig. 12 is a side elevation with portions broken away, showing a valve device similar to that of Fig. 1 but embodying a modified form of vent valve means, Fig. 13 is a transverse vertical section taken on section line 13—13 of Fig. 12, Fig. 14 is a transverse horizontal section taken on section line 14—14 of Fig. 13, and Fig. 15 is a partial bottom plan view.

As one practical embodiment of this invention, the drawings show a plug type valve device 10 which comprises, in general, a valve body 11 having a longitudinal fluid-flow passage 12 therein and a transverse bore 13 intersecting such passage, and an apertured valve plug 14 rotatable in the bore for controlling the passage. The valve device 10 also includes novel sealing means 15 cooperating with the plug 14, and a novel relief valve device 16 for releasing or venting fluid pressure from the discharge passage of the main valve device.

The valve body 11 is here shown as being a one-piece body having an inlet portion 17 at one end thereof and an outlet portion 18 at the other end thereof. The passage 12 extends longitudinally through the body 11 and includes an inlet passage portion 19 on one side of the bore 13 and located in the inlet portion 17. The passage 12 also includes an outlet passage portion 20 on the other or outlet side of the bore 13 and located in the outlet portion 18.

The inlet portion 17 is provided with an internal thread 22 for connection of the valve device 10 with a fluid pressure supply pipe. Similarly, the outlet portion 18 is provided with an internal thread 23 for connection with a brake hose, or the like, to which fluid pressure is to be supplied. In the valve body 11 as here shown, the outlet portion 18 extends in a downwardly and forwardly inclined or angular relation.

The transverse bore 13 is here shown as being a substantially cylindrical bore and the valve plug 14 is of a substantially cylindrical shape for operation in such bore with an annular clearance space 25 therebetween for ease of operation of the plug. The valve plug 14 is provided with a transverse control passage 26 for register with the main passage 12 of the valve body 11 when the plug is moved to its open position in which it is shown in Figs. 1 and 2.

At the lower end of the bore 13, the valve body 11 is provided with a recess 27 having a lower bushing 28 mounted therein. At the upper end of the bore 13, the valve body 11 has an internally threaded top opening 29 which is closed by a ring-shaped closure plug 30. The closure plug 30 has a central axial passage 31 which includes a counterbore 32. The counterbore 32 is aligned with the recess 27 and has an upper bushing 33 seated therein.

The valve plug 14 is rotatably mounted in the valve body 11 by being provided with axially extending lower and upper journal portions 37 and 38 which are rotatable in the bushings 28 and 33. The upper journal portion 38 is of an axial length to extend outwardly beyond the closure plug 30 and also forms a stem by which lever means in the form of an actuating handle 39 is connected with the plug. The handle 39 has a boss 39ª which is secured on the stem 38 by means of a transverse pin 40.

Leakage of fluid between the closure plug 30 and the stem 38 is prevented by a suitable packing ring 41 cooperating with the bushing 33 and mounted in a groove of the stem. Leakage of fluid between the closure plug 30 and the threaded portion 29 of the valve body is prevented by a suitable packing ring 42 provided on the closure plug in surrounding relation thereto. The closure plug 30 has a polygonally shaped external perimeter and is locked against loosening movement relative to the valve body 11 by bendable tabs 43 of a lock washer 44 lying against one or more flat sides 34 of such perimeter. The lock washer 44 has an anchor lug 36 engaged in a recess 45 of the valve body 11.

The sealing means 15 constitutes an important feature of the valve device 10 and is shown in the drawings as being located on the inlet passage side of the valve plug 14. The sealing means 15 comprises a packing sleeve 46 coaxially disposed in the main passage 12 and a pair of rings 47 and 48 cooperating with such packing sleeve. The packing sleeve 46 comprises a molded resilient tubular body 49 of suitable plastic or rubber-like material, and an annular rigid metal insert 50 incorporated in or joined to the molded body. At the inner end of the packing sleeve 46, a portion of the rubber-like material extends over or around the insert 50 to form a contoured or scalloped narrow sealing face or edge 51 which engages the valve plug 14 and conforms to the cylindrical peripheral shape of the latter.

The packing sleeve 46 also includes a flexible and elastic tubular end portion 52 which extends axially beyond the insert 50 and which lies against the internal annular wall 53 of the inlet passage portion 19. The tubular end portion 52 carries an integrally formed external projection means, preferably in the form of an external annular rib 54, which engages in an internal annular groove 55 of this inlet passage portion 19. The annular groove 55 is of a greater width axially of the passage portion 19 than the rib 54, such that an annular clearance space 56 remains when the rib is engaged in the groove 55 to permit axial shifting of the packing sleeve 46 toward the valve plug 14 for engagement of the contoured active sealing end 51 with the latter.

The packing sleeve 46 is rendered sealingly effective on the valve plug 14 and against the internal wall 53 of the passage 12 by a dual-purpose pressure applying means comprising the rings 47 and 48 and a helical compression spring 58. The ring 47 is a self-expanding spring metal ring disposed in the tubular end portion 52 of the packing sleeve 46 and serves to expand such tubular end portion for holding the latter in sealing engagement with the internal wall 53 and for retaining the external rib 54 engaged in the annular groove 55.

The ring 48 is a tubular member which is axially insertable into the expander ring 47 and maintains the latter in its expanded condition. The axial insertion of the ring 48 into the expanded ring 47 is facilitated by a tapered annular end portion 48ª provided on the ring 48. The ring 48 also forms a seat for the spring 58 and transmits thrusts from the latter to the internal annular shoulder 50ª formed by the end of the insert 50 of the packing sleeve 46 for pressing the active inner end 51 of the latter against the periphery of the valve plug 14.

The outer end of the spring 58 engages a spring seat which is formed by a spring metal snap ring 60 engaged in an internal annular groove 61 of the inlet portion 17. The spring ring 60 is a split ring of a commercially available type having apertured yoke portions on opposite sides of the split and engageable by a suitable tool for contracting the ring when it is to be withdrawn from the groove 61 for removal of the spring 58. Whenever removal of the packing sleeve 46 becomes desirable, the rings 48 and 47 can be removed in succession by a suitable withdrawal tool after which the packing sleeve itself can be readily extracted from the passage 12. The removal of the rings 48 and 47 is facilitated by the provision of openings 62 therein in which portions of the extracting tool are engageable.

The relief valve device 16 constitutes another important feature of the valve device 10. The relief valve means 16 is shown in this instance as being located in a laterally projecting integral boss 65 provided on one side of the valve body 11. This valve means comprises an annular valve seat 66 in a vent passage 67, and a valve member 68 movable axially in the vent passage and cooperating with the valve seat. The vent passage 67 has the inner end thereof in communication with the outlet passage portion 20 of the main valve device 10 through the above-mentioned clearance space 25 provided between the valve body and valve plug. The outer end of the vent passage 67 extends upwardly in the boss 65 and leads to the atmosphere.

The valve seat 66 is carried by an externally threaded bushing 69 which is screwed into an internally threaded portion 70 of the vent passage. The mounting of the bushing 69 in the threaded passage portion 70 is facilitated by providing the outer end of the bushing with a transverse screwdriver slot 71. A suitable packing ring 72 is provided between an internal shoulder 63 of the vent passage and the inner end of the bushing 69. The top portion of the bushing 69 immediately surrounding the axial passage 64 thereof is provided with an annular chamfer 64ª.

The valve member 68 has a head 73 thereon adjacent its inner end and a stem 74 extending axially upwardly through the passage 64 of the bushing 69. The valve member 68 also comprises a packing ring 76 lying against the head 73 and adapted to be sealingly pressed against the valve seat 66 by the latter. For a purpose to be explained hereinafter, the stem 74 is of a length such that the convexedly rounded upper end 78 thereof normally projects beyond the upper end of the bushing 69 and above the substantially flat top surface 79 of the boss 65.

The valve member 68 is normally maintained in a closed position with the packing ring 76 in engagement with the valve seat 66 by means of a compression spring 75 disposed in the passage 67 and seating against the head 73.

The transverse dimension of the stem 74 is such that a narrow annular passage 80 is provided between this stem and the wall of the bushing opening 64 and forms the discharge passage by which the upper end of the vent passage 67 of the relief valve means 16 is connected with the atmosphere. By having the discharge portion of the vent passage 67 in the form of this narrow annular passage 80, the entry of dust, rain, insects or other foreign matter, which might clog the vent passage or cause freezing of the valve member 68, will be substantially prevented.

The entry of rain or other foreign matter into the narrow annular passage portion 80 of the vent passage 67 is also prevented by a yieldable packing washer or ring 81 which is mounted in an annular groove 82 of the valve stem 74. The packing ring 81 normally extends across the annular passage 80 to exclude foreign matter therefrom but, upon opening of the valve member 68, the pressure being vented causes sufficient deflection of this packing ring to flow past the same to the atmosphere.

The actuating handle 39 for the plug 13 also serves as the actuating means for the valve member 68 of the auxiliary valve means 16. The handle 39 is shown in full lines in Figs. 1 and 2 in a longitudinal position corresponding with the open setting of the valve plug 14. The handle is releasably held in this open position by cooperating detent elements provided on the valve body and handle. The movement of the handle 39 from its open position to its transverse broken-line closed position 39a of Fig. 1 is a swinging movement about the axis of the valve plug 14 by which the handle is moved away from an upstanding locating stop 83 to a position adjacent another upstanding locating stop 84, the latter being formed as an upward extension of the boss 65.

The cooperating detent elements for positioning the handle 39 include a detent plunger 86 movable in a passage 87 provided in a depending boss 88 on the underside of the handle. The plunger 86 has a convexedly rounded lower end 89 which projects from the boss 88 and is normally extended therefrom by a compression spring 90 located in the passage 87. Another of the detent elements is in the form of a concave recess 91 provided in a flat portion 92 of the valve body 11 adjacent the locating stop 83 and in which the rounded lower end 89 of the detent plunger 86 releasably engages when the handle 39 is in the open position.

The depending boss 88 of the handle 39 is of a length such that its lower end is movable across the flat body portion 92 and across the flat top surface 79 of the boss 65 with a relatively small clearance therebetween. A sealing sleeve 93 made of a suitable packing material of an elastic character is mounted on the boss 88 in surrounding relation thereto and is of a length such that its lower end is engageable with the flat surface 92 surrounding the detent recess 91 when the handle 39 is in the open position. The sealing sleeve 93 will thus prevent water or other foreign matter from accumulating on the surface 94 or in the detent recess 91. When the handle 39 is moved to the closed transverse position 39a, the lower end of the handle boss 88 and the lower end of the packing sleeve 93 will sweep across the flat top surface 79 of the boss 65 and will displace any ice or other foreign matter which may have become lodged thereon.

The lower end of the boss 88 is preferably provided with a beveled edge 94 which exerts a camming action on the convex upper end 78 of the valve stem 74 to thereby move the valve member 68 downwardly to cause opening of the release valve device 15 for venting fluid pressure from the discharge passage portion 20 of the main valve 10 to atmosphere. As the movement of the handle 39 to its transverse position is completed by bringing the boss 88 into engagement with the stop 84, the lower end 89 of the detent plunger 86 rides onto the upper end of the valve stem 74 such that the valve member 68 will be maintained in its open position by the action of the detent spring 90 as long as the handle remains in its transverse position. The spring 90 is of a relatively stronger characteristic than the spring 82 and readily overcomes the latter when the plunger 86 is moved into axial alignment with the valve stem 74.

As long as the handle 39 remains in its transverse position, the lower end of the sealing sleeve 93 will be in a position surrounding the upper end of the valve stem 74 and will prevent rain or other foreign matter from entering the passage 80 while the valve member 68 is being thus held in its open position.

Figs. 12 to 15 inclusive show a cut-off valve device 96 which is generally similar to the above described valve device 10 but which embodies a vent valve means 97 of a modified form. The rotatable valve plug and the plug sealing means of the valve device 96 are similar in construction and functioning to the valve plug and sealing means of the above described valve device 10. These and other components of the valve device 96 which correspond with components of the valve device 10 are designated by the same reference characters.

The vent valve means 97 is located on the under side of the valve body 11 and is associated with the lower journal portion 37 of the valve plug 14. This vent valve means includes a vent passage 98 extending in the direction of the axis of rotation 99 of the valve plug 14 and formed in a depending boss 100 provided on the bottom of the body 11. The vent passage 97 connects the outlet passage portion 20 with the atmosphere when the valve plug 14 is rotated to its closed position by the handle 39, as will be further explained hereinafter. The vent valve means 97 also comprises an annular valve seat member 101 surrounding the vent passage 98 and a valve member 102 cooperating with the valve seat member and carrying a packing ring 103 for sealing engagement with the latter.

For a purpose which will be presently explained, the vent passage 98 is formed in the boss 100 in an offset or eccentric relation to the rotation axis 99 of the valve plug 14. The valve member 102 is provided at the upper end thereof with a stem portion 104 which extends into an end recess 105 of the journal portion 37. As shown in Figs. 13 and 14, the end recess 105 is preferably formed in the journal portion 37 so as to also be in an offset or eccentric relation to the rotation axis 99.

By reason of this eccentric position in which the stem portion 104 extends into the recess 105, it will be seen that when the plug 14 is rotated from its open or through position of Figs. 12 and 13 to its closed position, the side wall of the recess will exert a camming action against this stem portion to thereby tilt the valve member 102 and cause opening movement thereof relative to the seat member 101. The position of the recess 105 when the valve plug 14 has been thus rotated to its closed position is indicated in Fig. 14 by the broken-line position 105a.

The valve member 102 is in a normally closed position relative to the seat member 101 and is urged toward such closed position by a tension spring 107 whose lower end is anchored on a transverse pin 108 and whose upper end is connected with the valve member for exerting a downward pulling force thereon.

The end recess 105 of the journal portion 37 is in communication with the main passage 26 of the valve plug 14 through a connecting passage 109 of the latter. Since the main passage 26 of the valve plug is in communication with the outlet passage portion 20 through the clearance space 25 when the valve plug is in its closed position, it will be seen that the vent passage 98 will connect the outlet passage portion 20 with the atmosphere whenever the valve member 102 is moved off of the seat member 101 by the rotative movement of the valve plug 14, as above explained.

The volume of fluid being vented through the passage 98 can be controlled by providing this passage with orifice means adjacent the outer end thereof and which is here shown as comprising a plate member or disk 110 mounted in a counterbore 111 of the vent passage and having a restricted opening or orifice 112 therein of a predetermined size or flow capacity. The orifice member 110 can be omitted if an unrestricted flow of fluid through the vent passage 98 is desired.

The location of the vent passage 98 at a point on the under side of the valve housing 11 greatly reduces the likelihood of insects, water, or other foreign matter from entering the vent passage. The entry of such foreign matter into the vent passage 98 can be further prevented by providing a cover 113 of flexible sheet material in overlying relation to the disk 110 and the orifice 112.

The cover member 113 can be a sheet or disk of flexible and resilient rubber, or rubber-like material, and is retained in place against the orifice member 110 by a clamping ring 115 which is secured to the boss 99 as by means of the screws 116. The cover member 113 is provided with a self-closing passage 117 for connecting the orifice 112 with the atmosphere.

The self-closing passage 117 is here shown as being a slit formed in the cover member 113 in a staggered or offset relation to the orifice 112. By reason of the flexible character of the cover member 113, the passage 117 will be readily opened by the pressure of the fluid being vented and, when the flow of fluid subsides, the passage 117 will be automatically re-closed to exclude foreign matter from the orifice 112.

When the vent valve device 97 is located on the under side of the valve body 11 in associated relation to the journal portion 37, as shown in Figs. 12 and 13 and described above, the detent element for holding the handle 39 in its transverse position corresponding with the closed setting of the valve plug 14, comprises merely a recess 118 formed in the flat upper surface of the laterally projecting ledge 119 of the valve body. The lower end of the detent plunger 86 is releasably engageable in the recess 118. Accumulation of moisture or the like in the detent recess 118 is prevented by a drain hole 120 extending through the ledge 119.

From the accompanying drawings and the foregoing description it will now be readily understood that this invention provides a plug type valve device of a simple and durable construction comprising a relatively small number of parts which can be economically manufactured and assembled. It will also be understood that this invention provides such a plug type valve device having a novel and efficient form of sealing means for the plug and also having a novel and efficient form of relief valve means for venting fluid pressure to atmosphere from the discharge passage portion of the main valve device.

Although the valve device of this invention has been illustrated and described herein to a somewhat detailed extent it will be understood, of course, that the invention is not to be regarded as being limited correspondingly in scope but includes all changes and modifications coming within the terms of the claims hereof.

Having thus described my invention, I claim:

1. A valve device comprising, a valve body having a passage therein and a bore intersecting said passage, an apertured plug rotatable in said bore and controlling said passage, a packing sleeve in said passage and having an end portion for sealing cooperation with said plug, said sleeve also having internal shoulder means facing away from said plug and a flexible tubular portion extending beyond said shoulder means and axially along the wall of said passage, a radially expansible substantially cylindrical flat ring lying against the extending along said tubular portion, an expander ring axially shiftable in said flat ring and having an inner end engageable with said internal shoulder means for causing said end portion of the sleeve to be sealingly pressed against said plug in respone to such axial shifting of the expander ring, said expander ring having a tapered outer surface in wedging engagement with said flat ring and effective to expand the latter in response to said axial shifting for sealingly pressing said tubular portion against the wall of said passage, and spring means engaged against said expander ring for causing said axial shifting thereof.

2. A valve device as defined in claim 1 and in which the wall of said passage has an internal groove therein at a point spaced from said bore and said tubular portion has an external annular rib thereon and engaged in said groove, and wherein said flat ring extends along said tubular portion in an axially spanning relation to said groove.

3. A valve device comprising, a valve body having a fluid-flow passage therein and a bore intersecting said passage, an apertured plug rotatable in said bore for controlling said passage, a packing sleeve in said passage and having an end portion for sealing engagement with said plug, said sleeve comprising molded resilient material and including a reinforcing means of shorter axial length than the sleeve and defining an internal shoulder means thereon facing away from said plug, the portion of said sleeve extending beyond said reinforcing means being a flexible sleeve portion, an expandible ring in said sleeve portion, an expander ring having a tapered portion in wedging engagement with said expandible ring, and spring means effective on said expander ring to cause the same to expand said expandible ring for pressing said flexible sleeve portion against the wall of said passage and to cause said expander ring to engage said shoulder means for sealingly pressing said end portion against said plug.

4. A valve device comprising, a valve body having a passage therein and a bore intersecting said passage, an apertured plug of curved external shape rotatable in said bore for controlling said passage, the wall of said passage having an internal annular groove therein at a point spaced from said bore, a packing sleeve in said passage comprising a relatively thick-walled contoured end portion engaging said plug and a relatively thin-walled flexible sleeve portion extending away from said plug and carrying an external annular rib which is engaged in said groove, said thick-walled portion having a shoulder thereon lying within said sleeve portion and facing away from said plug, an expansible ring in said sleeve portion and extending therealong substantially opposite said rib, an expander ring in said expansible ring and having a tapered portion in wedging engagement with the latter, said expander ring being axially shiftable in said expansible ring for expanding the latter to press said rib into said groove and to apply axial thrust to said shoulder, and spring means effective on said expander ring to cause the axial shifting thereof.

References Cited in the file of this patent

UNITED STATES PATENTS

| 857,915 | Woody | June 25, 1907 |
| 870,113 | Lewis | Nov. 5, 1907 |
| 2,392,198 | Synder | Jan. 1, 1946 |
| 2,417,400 | Snyder | Mar. 11, 1947 |
| 2,483,891 | Downey | Oct. 4, 1949 |
| 2,605,994 | Borchardt | Aug. 5, 1952 |

FOREIGN PATENTS

| 133,129 | Sweden | Oct. 2, 1951 |